(12) United States Patent
Soane et al.

(10) Patent No.: US 8,894,863 B2
(45) Date of Patent: Nov. 25, 2014

(54) METHOD FOR REMOVAL OF DISSOLVED METAL CATIONS FROM AQUEOUS FLUIDS USING MODIFIED CAPTURE POLYMERS AND TETHER POLYMER BEARING ANCHOR PARTICLES

(75) Inventors: David S. Soane, Chestnut Hill, MA (US); Nathan Ashcraft, Somerville, MA (US)

(73) Assignee: Soane Mining, LLC, Cambridge, MA (US)

( * ) Notice: Subject to any disclaimer, the term of this patent is extended or adjusted under 35 U.S.C. 154(b) by 430 days.

(21) Appl. No.: 13/050,105

(22) Filed: Mar. 17, 2011

(65) Prior Publication Data

US 2012/0061321 A1    Mar. 15, 2012

Related U.S. Application Data

(60) Provisional application No. 61/314,892, filed on Mar. 17, 2010, provisional application No. 61/423,896, filed on Dec. 16, 2010.

(51) Int. Cl.
| | |
|---|---|
| *C02F 1/28* | (2006.01) |
| *C02F 1/68* | (2006.01) |
| *C02F 1/56* | (2006.01) |
| *C02F 1/42* | (2006.01) |
| *C02F 103/10* | (2006.01) |

(52) U.S. Cl.
CPC .............. *C02F 1/56* (2013.01); *C02F 2301/08* (2013.01); *C02F 1/683* (2013.01); *C02F 1/42* (2013.01); *C02F 2103/10* (2013.01)
USPC ............ 210/666; 210/679; 210/681; 210/688

(58) Field of Classification Search
USPC .......... 210/198.1, 502.1, 666, 681, 684, 688, 210/733, 734, 679
See application file for complete search history.

(56) References Cited

U.S. PATENT DOCUMENTS

3,198,839 A *  8/1965  Lalet .............................. 568/69
4,346,010 A    8/1982  Ogino et al.
(Continued)

FOREIGN PATENT DOCUMENTS

| WO | 2004060819 A1 | 7/2004 |
| WO | 2010098786 A1 | 9/2010 |

OTHER PUBLICATIONS

Mathew et al, Metal complexation of crosslinked polyacrylamide-supported dithiocarbamates: Effect of the molecular character and extent of crosslinking on complexation, Feb. 1991, Proc. Indian Acad. Sci. (Chem. Sci.) vol. 104, No. 1, pp. 43-56.*

(Continued)

*Primary Examiner* — Matthew O Savage
(74) *Attorney, Agent, or Firm* — Elmore Patent Law Group, P.C.; Mahreen Chaudhry Hoda; Carolyn S. Elmore, Esq.

(57) ABSTRACT

Systems and methods are presented for removing an ionic material from a fluid using a capture polymer that sequesters the ionic material and an anchor particle bearing a tethering polymer. The tethering polymer complexes with the capture polymer after the capture polymer has sequestered the ionic material, thereby affixing a complex of capture polymer and ionic material to the anchor particle to form a removable complex. The removable material can be segregated from the fluid via a removal system, thereby removing the ionic material from the fluid.

6 Claims, 4 Drawing Sheets

(56) References Cited

U.S. PATENT DOCUMENTS

| | | |
|---|---|---|
| 5,393,435 A | 2/1995 | Deans et al. |
| 5,433,865 A | 7/1995 | Laurent |
| 5,512,526 A * | 4/1996 | Greco .......................... 502/80 |
| 5,863,982 A * | 1/1999 | Huang et al. ................. 524/801 |
| 6,403,726 B1 * | 6/2002 | Ward ........................ 525/328.3 |
| 6,919,031 B2 | 7/2005 | Blumenschein et al. |
| 7,001,525 B2 | 2/2006 | Binot et al. |
| 7,153,436 B2 | 12/2006 | Bair et al. |
| 7,901,583 B2 | 3/2011 | McColl et al. |
| 8,349,188 B2 | 1/2013 | Soane et al. |
| 8,353,641 B2 | 1/2013 | Berg et al. |
| 2006/0151360 A1 | 7/2006 | Wright et al. |
| 2007/0085055 A1 | 4/2007 | Sikes et al. |
| 2007/0209971 A1 | 9/2007 | Duyvesteyn et al. |
| 2007/0289911 A1 | 12/2007 | Cymerman et al. |
| 2009/0206040 A1 | 8/2009 | Berg et al. |
| 2010/0098493 A1 | 4/2010 | McColl et al. |
| 2011/0094970 A1 | 4/2011 | Soane et al. |
| 2011/0131873 A1 | 6/2011 | Soane et al. |
| 2011/0252701 A1 | 10/2011 | Soane et al. |
| 2013/0134103 A1 | 5/2013 | Berg et al. |
| 2013/0193078 A1 | 8/2013 | Soane et al. |
| 2013/0336877 A1 | 12/2013 | Soane et al. |

OTHER PUBLICATIONS

Blumenschein, C. D., et al., "Sand Ballasted High Rate Clarification Process for Treatment of Process Water," available online at http://web.cecs.pdx.edu/~fishw/UO_Ballast-Actiflo.pdf. Oct. 2006.

"Actiflo™ Process : Key to Efficient High-Rate Clarification," available online at http://www.veoliawaterst.com/indepth/mining_fluent/13262,actiflo_process.htm, Nov. 2010.

Muylwyk, Q., et al., "Practical experiences in sand ballasted clarification processes," Proceedings of the Annual Conference of the Western Canada Water and Wastewater Association, Abstract (2004).

* cited by examiner

METHOD FOR REMOVAL OF DISSOLVED METAL CATIONS FROM AQUEOUS FLUIDS USING MODIFIED CAPTURE POLYMERS AND TETHER POLYMER BEARING ANCHOR PARTICLES

RELATED APPLICATIONS

This application claims the benefit of U.S. Provisional Application Ser. No. 61/314,892 filed on Mar. 17, 2010 and U.S. Provisional Application Ser. No. 61/423,896 filed on Dec. 16, 2010. The entire contents of the above applications are incorporated by reference.

PARTIES TO A JOINT RESEARCH AGREEMENT

Soane Mining, LLC and Soane Energy, LLC are parties to a "joint research agreement" as defined in 35 U.S.C. 103(c)(3).

BACKGROUND

In typical mining operations, water is used as part of the process to separate desired mineral from mined ore, resulting in an aqueous wastewater stream containing a combination of dispersed solids, fine particulates, and/or dissolved contaminants. This stream, known as the tailings stream, poses significant environmental, economic and operations issues for mines. The cheapest and most common way to handle tailings is to pump the fluid stream into an impounded area, called a tailings pond, where the suspended solids gradually settle out from the fluid over time while the water evaporates or is removed from the surface. This settling process can require years, even decades, for separating the solids from tailings fluids.

Tailings ponds have a number of adverse effects on the environment. They occupy a large surface area, disturbing the surrounding landscape by their very presence and occupying land that could be used more constructively in other ways. Tailings ponds also expose the environment to contaminants, including seepage of hazardous materials into groundwater and dispersion of hazardous materials into the air as dried particulate matter, i.e., dust. Metal ions are significant contaminants in tailings ponds. Economic considerations come into play here: because the tailings stream represents unusable waste to the mine operators, there is little incentive to adopt costly technologies for tailings management. There remains a need in the art, therefore, for a reliable, economical solution that can be readily implemented for solving the problems caused by tailings streams.

SUMMARY

Disclosed herein, in embodiments, are systems for removing an ionic material from a fluid, comprising a capture polymer that sequesters the ionic material, and an anchor particle bearing a tethering polymer, whereby the tethering polymer complexes with the capture polymer after the capture polymer has sequestered the ionic material, thereby affixing a complex comprising the capture polymer and ionic material to the anchor particle to form a removable material; and a removal system for segregating the removable material from the fluid, thereby removing the ionic material from the fluid. In embodiments, the ionic material is a cationic material. In embodiments, the ionic material is an anionic material. In embodiments, the capture polymer is an anionic polymer. In embodiments, the capture polymer is a cationic polymer. In embodiments, the capture polymer is a modified capture polymer, and it can comprise a polyacrylamide polymer. In certain aspects, the ionic material is an ionic contaminant.

Also disclosed herein, in embodiments, are methods for removing an ionic material from a fluid, comprising adding to the fluid a capture polymer that sequesters the ionic material, adding to the fluid a tether-bearing anchor particle, wherein the tether complexes with the capture polymer to attach the capture polymer to the tether-bearing anchor particle, and removing from the fluid a solid material comprising the tether complexed with the capture polymer that sequesters the ionic material, whereby removing the solid material from the fluid removes the ionic material from the fluid. In embodiments, the ionic material is a cationic material. In embodiments, the ionic material is an anionic material. In embodiments, the capture polymer is an anionic polymer. In embodiments, the capture polymer is a cationic polymer. In embodiments, the capture polymer is a modified capture polymer, and it can comprise a polyacrylamide polymer.

Further disclosed herein are systems for removing an organic material from a fluid, comprising: a capture polymer that sequesters the organic material, and an anchor particle bearing a tethering polymer, whereby the tethering polymer complexes with the capture polymer after the capture polymer has sequestered the organic material, thereby affixing a complex of capture polymer and organic material to the anchor particle to form a removable material; and a removal system for segregating the removable material from the fluid, thereby removing the organic material from the fluid. In embodiments, disclosed herein are methods for removing an organic material from a fluid, comprising adding to the fluid a capture polymer that sequesters the organic material, adding to the fluid a tether-bearing anchor particle, wherein the tether complexes with the capture polymer to attach the capture polymer to the tether-bearing anchor particle, and removing from the fluid a solid material comprising the tether complexed with the capture polymer that sequesters the organic material, whereby removing the solid material from the fluid removes the organic material from the fluid.

Also disclosed herein are methods for removing an ionic material from a fluid, comprising precipitating the ionic material in the fluid to form a precipitate, adding to the fluid a tether-bearing anchor particle, wherein the tether complexes with the precipitate to attach the precipitate to the tether-bearing anchor particle to form a solid material, and removing the solid material from the fluid, thereby removing the ionic material from the fluid. Methods are also disclosed for removing an ionic material from a fluid, comprising precipitating the ionic material in the fluid to form a precipitate, complexing the precipitate with an activator polymer to form an activator-polymer complex, adding to the fluid a tether-bearing anchor particle, wherein the tether-bearing anchor particle complexes with the activator-polymer complex to form a solid material, and removing the solid material from the fluid, thereby removing the ionic material from the fluid.

DETAILED DESCRIPTION

Figure 1:
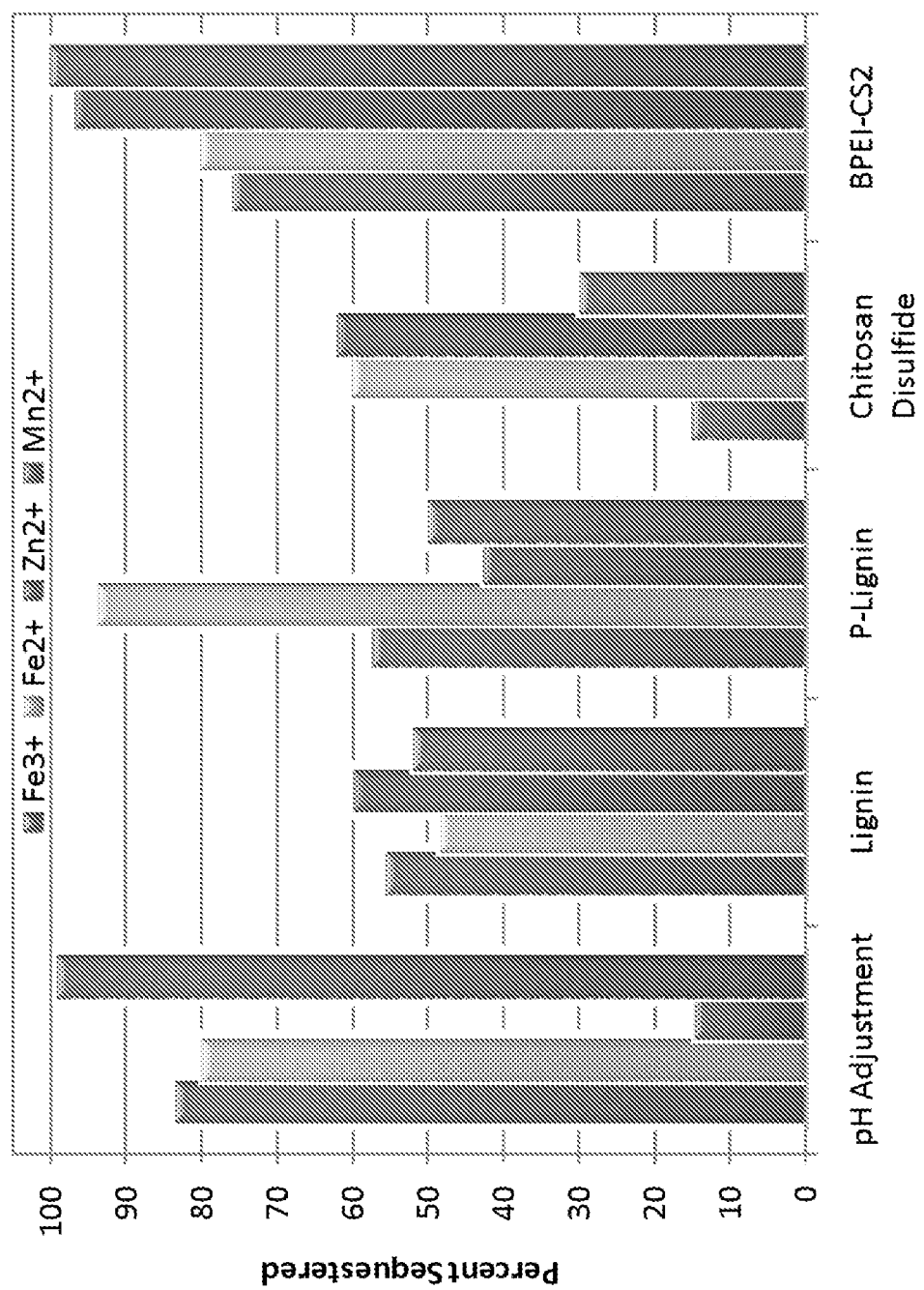
FIG. 1 shows a graph of metal sequestration using various agents.

Disclosed herein are robust treatments for removing metal ions from mine water and tailings streams. In embodiments, the disclosed systems and methods can effectively capture contaminants such as dissolved heavy metals in tailings ponds by means of high-affinity complex formation between selected, specially designed polymers and the target contaminant(s). In other embodiments, dissolved anions contained in wastewater can be removed using the systems and methods disclosed herein. Examples of anions found in wastewater streams include sulfates, phosphates, nitrates, carbonates, and the like.

The operation of these systems and methods can rapidly sequester contaminant materials from a fluid stream, yielding clarified water and a consolidated material that removes the metal ions from the tailings into an easy-to-segregate solid. The systems and methods disclosed herein have applicability to a number of tailings-related problems, including tailings disposal, reducing the tailings pond footprints, controlling environmental degradation and groundwater contamination from tailings ponds contents, and eliminating the dissemination of hazardous dusts from mining waste disposal. In embodiments, these systems and methods can be used in a variety of mining processes, such as coal mining, phosphate mining, heavy metals mining, and the like.

Disclosed herein are systems and methods for enhancing the settlement rate of dispersed or dissolved materials by incorporating them within a coarser particulate matrix, so that solids can be removed from aqueous suspension as a material having mechanical stability. The systems and methods disclosed herein involve three components: (1) removing the ions from solution, either by precipitating them or by capturing the ions in solution via sequestrant polymers, (2) adding tether-bearing anchor particles to the solution containing the ion/polymer complexes, and (3) sedimenting the fine particle-anchor particle complex to yield a geotechnically stable solid and a purified fluid stream. As a particular advantage, these technologies work rapidly, quickly consolidating the solids and the dissolved ions from the tailings into a solid mass, and leaving behind clarified water.

In certain embodiments, metal ions can be removed from the solution by precipitating them. Ions within the tailings can be precipitated by an initial treatment, typically a pH adjustment, for example adjusting the pH of the tailings to a pH above about 7.0. Once the metal ions are precipitated, they may be more readily flocculated or aggregated, allowing their removal. In certain cases, the precipitated metal ions can form flocs or aggregates that can complex with tether-bearing anchor particles, as described below in more detail. In those practices where metal ions are precipitated from the solution, the use of a capture polymer is optional. In such cases, the precipitated metal ions can complex directly with a tether-bearing anchor particle, for example, an anchor particle bearing tethering polymers such as the cationic tethering polymers recited below, including polyacrylamide and partially hydrolyzed polyacrylamide. In other embodiments, the aggregation of the precipitated metal ions can be enhanced by an "activation" step involving activating polymers that enhance flocculation of the precipitated metal ions and that are able to complex with a tether-bearing anchor particle, as described below.

In embodiments, for example, the activation step involves adding a flocculant or polymer to the solution to a suspension of the precipitated metal ions. Preferably, the polymers or flocculants can be charged, including anionic or cationic polymers. In embodiments, anionic polymers can be used, including, for example, olefinic polymers, such as polymers made from polyacrylate, polymethacrylate, partially hydrolyzed polyacrylamide, and salts, esters and copolymers thereof such as (sodium acrylate/acrylamide) copolymers, sulfonated polymers, such as sulfonated polystyrene, and salts, esters and copolymers thereof. Suitable cationic polymers for activation agents include: polyvinylamines, polyallylamines, polydiallyldimethylammoniums (e.g., the chloride salt), branched or linear polyethyleneimine, crosslinked amines (including epichlorohydrin/dimethylamine, and epichlorohydrin/alkylenediamines), quaternary ammonium substituted polymers, such as (acrylamide/dimethylaminoethylacrylate methyl chloride quat) copolymers and trimethylammoniummethylene-substituted polystyrene, and the like. Nonionic polymers can also be used for the activation step, where their activity is conducted by hydrogen bonding interactions. In embodiments, nonionic polymers such as polyethylene oxide, polypropylene oxide, polyhydroxyethylacrylate, polyhydroxyethylmethacrylate, and the like. In embodiments, for example, an activator such as polyethylene oxide can be used as an activator with a cationic tethering material in accordance with the description of tethering materials below. In embodiments, activator polymers with hydrophobic modifications can be used. Flocculants such as those sold under the trademark MAGNAFLOC® by Ciba Specialty Chemicals can be used. In embodiments, activators such as polymers or copolymers containing carboxylate, sulfonate, phosphonate, or hydroxamate groups can be used. These groups can be incorporated in the polymer as manufactured, alternatively they can be produced by neutralization of the corresponding acid groups, or generated by hydrolysis of a precursor such as an ester, amide, anhydride, or nitrile group. The neutralization or hydrolysis step could be done on site prior to the point of use, or it could occur in situ. For example, the surface of the precipitated particles can be modified with a multifunctional coupling agent or a polymer. The multifunctional coupling agent can be a silane or an amino silane coupling agent as an example. Suitable coupling agents include isocyano silanes and epoxy silanes. Polyamines such as polyallyl amine, polyvinyl amine, chitosan, polyethylenimine, and the like, can also self-assemble on the surface of the precipitated particles to functionalize them without need for a coupling agent. In embodiments, they can also be precipitated onto the surface, as is seen in the case of chitosan: since chitosan is soluble in acidic aqueous conditions, it can be precipitated onto surfaces by raising the pH of the solution within which the surfaces (e.g., the metal ion precipitates) are contained. In embodiments, the amines or a majority of amines are charged.

In certain other embodiments, no precipitation takes place. Instead, ions are removed from solution by the use of specific polymers that capture dissolved metal ion contaminants as polymer-ion complexes. After this "capture" phase, the complexes produced are exposed to polymer-bearing coarse solids that attach to the complexes and act as "anchors" to bind the complexes together to form a cohesive, solid mass that sinks by gravity or can be otherwise removed (by filtration, flotation, centrifugation, etc.) out of the fluid stream. The resultant solid mass is easily dewatered and is geotechnically stable, suitable for disposal by stacking, and for use as landfill, as road construction material, etc. Left-over water from the fluid stream can be reused for other mining operations or treated using conventional waste-treatment technologies.

1. Capture

As used herein, the term "capture" refers to the interaction of a sequestrant material, such as a polymer, with metal ions in a liquid medium, such as an aqueous solution.

A "capture polymer" can carry out the sequestration of metal ions. In embodiments, specific high molecular weight polymers bearing functional groups with high affinity for metal ion binding can be used as capture polymers. After trapping the metal ions, the capture polymers tend to interact with each other to form agglomerates.

In embodiments, polymers can be prepared using functional groups that bind metal well. For example, phosphorylated lignin, carbon-disulfide-modified branched polyethyleneimine, and carbon-disulfide-modified chitosan can be used.

In embodiments, anionic polymers can be used for removal of cationic metal ions, including, for example, olefinic polymers, such as polymers made from polyacrylate, polymethacrylate, partially hydrolyzed polyacrylamide, and salts, esters and copolymers thereof (such as sodium acrylate/acrylamide), copolymers, sulfonated polymers, such as sulfonated polystyrene, and salts, esters and copolymers thereof.

In embodiments, cationic or nonionic polymers can be modified with agents that can sequester metal ions. Suitable polycations include: polyvinylamines, polyallylamines, polydiallyldimethylammoniums (e.g., the chloride salt), branched or linear polyethyleneimine, crosslinked amines (including epichlorohydrin/dimethylamine, and epichlorohydrin/alkylenediamines), quaternary ammonium substituted polymers, such as (acrylamide/dimethylaminoethylacrylate methyl chloride quat) copolymers and trimethylammoniummethylene-substituted polystyrene, and the like. Flocculants such as those sold under the trademark MAGNAFLOC® by Ciba Specialty Chemicals can be used.

In embodiments, polycations can be used to remove dissolved anions from a wastewater stream. Suitable polycations include polyvinylamines, polyallylamines, polydiallyldimethylammoniums (e.g., polydiallyldimethylammonium chloride, branched or linear polyethyleneimine, crosslinked amines (including epichlorohydrin/dimethylamine, and epichlorohydrin/alkylenediamines), quaternary ammonium substituted polymers, such as (acrylamide/dimethylaminoethylacrylate methyl chloride quat) copolymers and trimethylammoniummethylene-substituted polystyrene, polyvinylamine, and the like. Also, chitosan, and other biopolymers including lignin, cellulose, and starches; plus modified/quaternized versions of these biopolymers.

The positively charged functional groups in many cationic polymers are amine-based, and in certain cases, amines may not form stable enough complexes with dissolved anions to remove the anions by a desired amount. Thus to improve the anionic species removal based on the methodology herein, the anionic species may first be exposed to a complexing agent that forms an insoluble complex with the anionic species. Examples include using calcium-containing moieties to bind sulfates and phosphates. Calcium can be introduced through various materials including lime and colloidal calcium oxide. After the insoluble complex is formed, the complex is captured using either an anionic or cationic polymer, followed by exposure to a tether-bearing anchor material.

In embodiments, polymers can be modified with specific functional groups to produce a type of capture polymers called "modified capture polymers." As an example, polyacrylamide can be modified with carbon disulfide groups to produce a capture polymer. This allows use of common high-molecular weight polymers like polyacrylamides, with specific functionalization to attract designated ionic species. The acrylamide groups on polyacrylamides can also be modified to form a capture polymer having particular characteristics or attraction to tether polymers, for example where the acrylamide groups have been partially hydrolyzed to yield negatively charged regions that attract positively-charged tether polymers, or where the acrylamide groups have been partially quaternized to yield positively charged regions that attract negatively-charged tether polymers. Using the example of carbon-disulfide modified polyacrylamide, the carbon disulfide groups can bind the designated metal ions, producing a polymer-metal complex whose charge will depend on the charge of the starting polyacrylamide polymer: negative if partially hydrolyzed, or positive if partially quaternized.

In embodiments, polymers can be used for capturing soluble organic compounds. Examples of mining processes that generate soluble organic compounds can include phosphate rock mining, china clay mining, bauxite refining, trona (soda ash) mining, and coal mining and processing. Soluble organic materials can be difficult to remove from industrial wastewater streams and can prevent streams from being recycled or discharged.

In embodiments, polymers for use herein can be derived from naturally-occurring or biological materials, including lignins, humic acids, chitosan, starches, and the like. In embodiments, such polymers can be modified, for example by phosphorylation, by carbon disulfide modification, etc. Hence, suitable polymers can include, for example phosphorylated lignin, carbon-disulfide-modified lignin, phosphorylated starches, carbon-disulfide-modified starches, phosphorylated chitosan, carbon-disulfide-modified chitosan, etc. More generally, polymers for use herein include other modified polymers such as carbon-disulfide-modified polyamines (e.g., branched polyethyleneimine), phosphorylated alcohols (e.g., polyvinyl alcohol), hydroxamic acid-containing polymers, phosphonic acid-containing polymers, carboxylic acid-containing polymers, sulfonic acid-containing polymers, and the like.

In embodiments, polymers or copolymers containing carboxylate, sulfonate, phosphonate, hydroxamate, methylthiourea, dithiocarbamate and guanylthiourea groups can be used. These groups can be incorporated in the polymer as manufactured, alternatively they can be produced by neutralization of the corresponding acid groups, or generated by hydrolysis of a precursor such as an ester, amide, anhydride, or nitrile group. The neutralization or hydrolysis step could be done on site prior to the point of use, or it could occur in situ in the process stream.

2. Tethering

As used herein, a "tethering" polymer is one having an affinity for a capture polymer, and also being attachable to an anchor particle (as described below). In embodiments, an anchor particle can be treated or coated with a tethering material. The tethering material, such as a polymer, forms a complex or coating on the surface of the anchor particles such that the tethered anchor particles can complex with capture polymers, in particular those that have already bound to metal ions. In embodiments, the selection of tether and capture polymeric materials is intended to make the two streams complementary so that the capture polymers complexed with metal ions become tethered, linked or otherwise attached to the anchor particle. When attached to capture polymers via tethering, the anchor particles enhance the rate and completeness of sedimentation or removal of the metal ions.

In accordance with these systems and methods, the tethering material acts as a complexing agent to affix the capture polymers to an anchor material. In embodiments, sand can be used as an anchor material, as may a number of other substances, as set forth in more detail below. In embodiments, a tethering material can be any type of material that interacts strongly with the capture polymer and that is connectable to an anchor particle.

As used herein, the term "anchor particle" refers to a particle that, when bearing a tethering polymer, facilitates the separation of capture polymers complexed with metal ions. In embodiments, anchor particles have a density that is greater than the liquid process stream. For example, anchor particles that have a density of greater than 1.3 g/cc can be used. Additionally or alternatively, the density of the anchor particles can be greater than the density of the complexed capture polymers. Alternatively, the density is less than the dispersal medium, or density of the liquid or aqueous stream. Alternatively, the anchor particles are simply larger than the complexed capture polymers. A difference in density or particle size facilitates separating the solids from the medium.

For example, for the removal of particulate matter with an approximate mean diameter less than 50 microns, anchor particles may be selected having larger dimensions, e.g., a mean diameter of greater than 70 microns. An anchor particle for a given system can have a shape adapted for easier settling when compared to the target particulate matter: spherical particles, for example, may advantageously be used as anchor particles to remove particles with a flake or needle morphology. In other embodiments, increasing the density of the anchor particles may lead to more rapid settlement. Alternatively, less dense anchors may provide a means to float the fine particles, using a process to skim the surface for removal. In this embodiment, one may choose anchor particles having a density of less than about 0.9 g/cc, for example, 0.5 g/cc, to remove fine particles from an aqueous process stream.

Suitable anchor particles can be formed from organic or inorganic materials, or any mixture thereof. Particles suitable for use as anchor particles can include organic or inorganic particles, or mixtures thereof. Inorganic particles can include one or more materials such as calcium carbonate, dolomite, calcium sulfate, kaolin, talc, titanium dioxide, sand, diatomaceous earth, aluminum hydroxide, silica, other metal oxides and the like. The coarse fraction of the solids recovered from the mining process itself, is a preferred particle source for anchor particles. Organic particles can include one or more materials such as starch, modified starch, polymeric spheres (both solid and hollow), and the like. Particle sizes can range from a few nanometers to few hundred microns. In certain embodiments, macroscopic particles in the millimeter range may be suitable.

In embodiments, a particle, such as an amine-modified particle, may comprise materials such as lignocellulosic material, cellulosic material, minerals, vitreous material, cementitious material, carbonaceous material, plastics, elastomeric materials, and the like. In embodiments, cellulosic and lignocellulosic materials may include wood materials such as wood flakes, wood fibers, wood waste material, wood powder, lignins, or fibers from woody plants.

Examples of inorganic particles include clays such as attapulgite and bentonite. In embodiments, the inorganic compounds can be vitreous materials, such as ceramic particles, glass, fly ash and the like. The particles may be solid or may be partially or completely hollow. For example, glass or ceramic microspheres may be used as particles. Vitreous materials such as glass or ceramic may also be formed as fibers to be used as particles. Cementitious materials may include gypsum, Portland cement, blast furnace cement, alumina cement, silica cement, and the like. Carbonaceous materials can include, for example, carbon black, graphite, carbon fibers, carbon microparticles, and carbon nanoparticles, for example carbon nanotubes.

In embodiments, plastic materials can be used as particles. Both thermoset and thermoplastic resins can be used to form plastic particles. Plastic particles can be shaped as solid bodies, hollow bodies or fibers, or any other suitable shape. Plastic particles can be formed from a variety of polymers. A polymer useful as a plastic particle can be a homopolymer or a copolymer. Copolymers can include block copolymers, graft copolymers, and interpolymers. In embodiments, suitable plastics can include, for example, addition polymers (e.g., polymers of ethylenically unsaturated monomers), polyesters, polyurethanes, aramid resins, acetal resins, formaldehyde resins, and the like. Additional polymers can include, for example, polyolefins, polystyrene, and vinyl polymers. Polyolefins can include, in embodiments, polymers prepared from $C_2$-$C_{10}$ olefin monomers, e.g., ethylene, propylene, butylene, dicyclopentadiene, and the like. In embodiments, poly(vinyl chloride) polymers, acrylonitrile polymers, and the like can be used. In embodiments, useful polymers for the formation of particles may be formed by condensation reaction of a polyhydric compound (e.g., an alkylene glycol, a polyether alcohol, or the like) with one or more polycarboxylic acids. Polyethylene terephthalate is an example of a suitable polyester resin. Polyurethane resins can include, e.g., polyether polyurethanes and polyester polyurethanes. Plastics can also be obtained for these uses from waste plastic, such as post-consumer waste including plastic bags, containers, bottles made of high density polyethylene, polyethylene grocery store bags, and the like.

In embodiments, plastic particles can be formed as expandable polymeric pellets. Such pellets may have any geometry useful for the specific application, whether spherical, cylindrical, ovoid, or irregular. Expandable pellets can be pre-expanded before using them. Pre-expansion can take place by heating the pellets to a temperature above their softening point until they deform and foam to produce a loose composition having a specific density and bulk. After pre-expansion, the particles can be molded into a particular shape and size. For example, they can be heated with steam to cause them to fuse together into a lightweight cellular material with a size and shape conforming to the mold cavity. Expanded pellets may be 2-4 times larger than unexpanded pellets. As examples, expandable polymeric pellets may be formed from polystyrenes and polyolefins. Expandable pellets are available in a variety of unexpanded particle sizes. Pellet sizes, measured along the pellet's longest axis, on a weight average basis, can range from about 0.1 to about 6 mm.

In embodiments, the expandable pellets can be formed by polymerizing the pellet material in an aqueous suspension in the presence of one or more expanding agents, or by adding the expanding agent to an aqueous suspension of finely subdivided particles of the material. An expanding agent, also called a "blowing agent," is a gas or liquid that does not dissolve the expandable polymer and which boils below the softening point of the polymer. Blowing agents can include lower alkanes and halogenated lower alkanes, e.g., propane, butane, pentane, cyclopentane, hexane, cyclohexane, dichlorodifluoromethane, and trifluorochloromethane, and the like. Depending on the amount of blowing agent used and the technique for expansion, a range of expansion capabilities exist for any specific unexpanded pellet system. The expansion capability relates to how much a pellet can expand when heated to its expansion temperature. In embodiments, elastomeric materials can be used as particles. Particles of natural or synthetic rubber can be used, for example.

In embodiments, the particle can be substantially larger than the capture polymer complexes it is separating out from the process stream. In other embodiments, the particle can be substantially smaller than the particulate matter it is separating out of the process stream, with a number of such particles interacting in order to complex with the much larger polymer complexes. Particles can also be selected for modification that have shapes adapted for easier settling when compared to the target polymer complexes. In other embodiments, dense particles can be selected for modification, so that they settle rapidly when complexed with the capture polymers. In yet other embodiments, extremely buoyant particles may be selected for modification, so that they rise to the fluid surface after complexing with the capture polymers, allowing the complexes to be removed via a skimming process rather than a settling-out process. In embodiments where the modified particles are used to form a filter, as in a filter cake, the particles selected for modification can be chosen for their low packing density or porosity.

Advantageously, particles can be selected that are indigenous to a particular geographical region where the particulate removal process would take place. For example, sand can be used as the particle to be modified for removing particulate matter from the waste stream (tailings) of certain mining processes, as can rocks, minerals or other geological particulate matter derived from mining processes. It is also envisioned that the complexes formed from the modified particles and the capture polymers can be recovered and used for other applications.

Anchor particle sizes (as measured as a mean diameter) can have a size up to few hundred microns, preferably greater than about 70 microns. In certain embodiments, macroscopic anchor particles up to and greater than about 1 mm may be suitable. Recycled materials or waste, particularly recycled materials and waste having a mechanical strength and durability suitable to produce a product useful in building roads and the like are particularly advantageous.

In embodiments, the anchor particles may be modified to produce desirable properties. As an example, a modifier such as wax can facilitate the capture of certain organic materials. The wax can be coated on the anchor particles by dry blending, melting, or mixing with a compatible solvent. Waxes such as beeswax, Carnauba wax, Paraffin wax, Castor wax, and tallows, for example, can be used to modify the anchor particles, before or simultaneous to the application of the tethering agents thereto. As other examples, modifiers such as castor oil, vegetable oil, mineral oil, fuel oil, kerosene, or other hydrocarbon blends can be used to modify the anchor particles, producing enhanced ability to capture specific contaminants. The functionalized anchor particles can be added to a stream to removed specific organic material or can be employed as a filtration media.

As an example of a tethering material used with an anchor particle in accordance with these systems and methods, chitosan can be precipitated onto sand particles, for example, via pH-switching behavior. The chitosan can have affinity for anionic systems that are used as capture polymers. The cationic charge of the chitosan will attract the anionic charge of capture polymers, to attach the anchor particles to the capture polymers that have sequestered the metal ions.

In embodiments, various interactions such as electrostatic, hydrogen bonding or hydrophobic behavior can be used to affix a capture polymer to a tethering material complexed with an anchor particle. In embodiments, polymers such as linear or branched polyethyleneimine can be used as tethering materials. It would be understood that other anionic or cationic polymers could be used as tethering agents, for example polydiallyldimethylammonium chloride poly(DADMAC).

In other embodiments, cationic tethering agents such as epichlorohydrin dimethylamine (epi/DMA), styrene maleic anhydride imide (SMAI), polyethylene imide (PEI), polyvinylamine, polyallylamine, amine-aldehyde condensates, poly(dimethylaminoethyl acrylate methyl chloride quaternary) polymers and the like can be used. Advantageously, cationic polymers useful as tethering agents can include quaternary ammonium or phosphonium groups. Advantageously, polymers with quaternary ammonium groups such as poly (DADMAC) or epi/DMA can be used as tethering agents. In other embodiments, polyvalent metal salts (e.g., calcium, magnesium, aluminum, iron salts, and the like) can be used as tethering agents. In other embodiments cationic surfactants such as dimethyldialkyl($C_8$-$C_{22}$)ammonium halides, alkyl ($C_8$-$C_{22}$)trimethylammonium halides, alkyl($C_8$-$C_{22}$)dimethylbenzylammonium halides, cetyl pyridinium chloride, fatty amines, protonated or quaternized fatty amines, fatty amides and alkyl phosphonium compounds can be used as tethering agents. In embodiments, polymers having hydrophobic modifications can be used as tethering agents.

The efficacy of a tethering material, however, can depend on the capture polymer. A high affinity between the tethering material and the capture polymer can lead to a strong and/or rapid interaction there between. A suitable choice for tethering material is a material that can remain bound to the anchor surface, but can impart surface properties that are beneficial to a strong complex formation with the capture polymer.

In hydrogen bonding terms, a hydrogen bond donor should be used in conjunction with a hydrogen bond acceptor. In embodiments, the tether material can be complementary to the chosen capture polymer. In other embodiments, cationic-anionic interactions can be arranged between capture polymers and tether-bearing anchor particles. The complementary tethering material can be selected to have affinity for the specific anchor particles being used in the system. In other embodiments, hydrophobic interactions can be employed in the capture polymer/tethering system.

3. Settling

It is envisioned that the complexes formed from the anchor particles and the capture polymers can be removed from the fluid stream through use of a variety of removal systems. Once segregated from the fluid stream, the removable solid material can be recovered and used for other applications. In embodiments, the interactions between the capture polymers and the tether-bearing anchor particles can enhance the mechanical properties of the removable material that they form. For example, a capture polymer or collection thereof can be durably bound to one or more tether-bearing anchor particles, so that they do not segregate or move from the position that they take on the particles. This property of the complex can make it mechanically more stable. Increased compatibility of the capture polymer with a denser (anchor) matrix modified with the appropriate tether polymer can lead to further mechanical stability of the resulting composite material. This becomes quite important when dealing with tailings resulting from mining. This composite material can then be further utilized within the project for road building, dyke construction, or even land reclamation, rather than simply left in a pond to settle at a much slower rate.

A variety of techniques or removal systems are available for removing the resulting complexes from the fluid stream. For example, the tether-bearing anchor particles can be mixed into a fluid stream carrying capture polymers bound to metal ions, and the complexes can then separated via a settling process such as gravity or centrifugation. In another method, the process stream carrying the capture polymers bound to metal ions could flow through a bed or filter cake of the tether-bearing anchor particles. In any of these methods, the capture polymers interact with the metal ions so that later separation removes both capture polymers and metal ions.

As would be appreciated by artisans of ordinary skill, a variety of separation processes could be used to remove the complexes of capture polymers with anchor particles. For example, if the anchor particles had magnetic properties, the complexes formed by the interaction of tether-bearing anchor particles and capture polymers could be separated using a magnetic field. As another example, if the tether-bearing anchor particles were prepared so that they were electrically conductive, the complexes formed by the interaction of tether-bearing anchor particles and capture polymers could be separated using an electric field.

EXAMPLES

The following materials were used in the Examples below:
Lignin, MeadWestVaco, Richmond, Va.
Phosphoric Acid, 85% in water, Sigma-Aldrich, St. Louis, Mo.
Urea, ≥98% powder, Sigma-Aldrich, St. Louis, Mo.
Polyethyleneimine, branched, 50% in water, Sigma-Aldrich, St. Louis, Mo.
Carbon disulfide, Sigma-Aldrich, St. Louis, Mo.
Sodium hydroxide, pellets, ≥97%, Sigma-Aldrich, St. Louis, Mo.
Acetone, VWR, West Chester, Pa.
Chitosan cg-800, Primex, Siglufjordur, Iceland
Methanol, Sigma-Aldrich, St. Louis, Mo.
Ammonium hydroxide, 28-30% $NH_3$ basis, Sigma-Aldrich, St. Louis, Mo.
Sand, Sigma-Aldrich, St. Louis, Mo.
Tailings solids from mineral mine.
Attapulgite, Oildri, Chicago, Ill.
Zeolite, Bear River, Preston, Id.
Poly(diallyldimethylammonium chloride), 20% in Water, Sigma-Aldrich, St. Louis, Mo.
Diatomaceous earth, filter grade, EP Minerals, Reno, Nev.
Hydrochloric acid, Sigma-Aldrich, St. Louis, Mo.
Iron(III) chloride, Sigma-Aldrich, St. Louis, Mo.
Iron(II) chloride, Sigma-Aldrich, St. Louis, Mo.
Zinc chloride, Sigma-Aldrich, St. Louis, Mo.
Manganese nitrate tetrahydrate, Sigma-Aldrich, St. Louis, Mo.
Humic Acid, Sigma-Aldrich, St. Louis, Mo.
Hyperfloc CP 905, Hychem, Inc., Tampa, Fla.
Magnafloc 336, BASF, Florham Park, N.J.
DAF-50, Polymer Ventures, Charleston, S.C.
DCF-10, Polymer Ventures, Charleston, S.C.
Flopam AN 310VHM, SNF Inc., Riceboro, Ga.

Example 1

Phosphorylated Lignin

Lignin was modified with phosphoric acid to produce phosphorylated lignin (p-lignin) based on a procedure by Bykov and Ershov [Bykov G L, Ershov B G. Sorption of uranyl ions on phosphorylated lignin. Radiochemistry. 2009; 51(3):292-294]. Lignin was first treated in a mixture of phosphoric acid and urea for one hour at 80° C. The composition of the mixture is the following:
6 g lignin
28.8 g deionized water
5.25 mL phosphoric acid
22.2 g urea After the one hour treatment, the lignin solids were recovered by vacuum filtration and rinsed three times with DI water. The solids were then heated at 150° C. for one hour. After heat treatment the phosphorylated lignin was dissolved in DI water. Any lignin that was not dissolved, likely due to a low degree of phosphorylation, was separated by filtration leaving a highly soluble phosphorylated lignin solution.

Example 2

Carbon Disulfide-Modified Branched Polyethyleneimine

The amine groups in branched polyethylene imine (BPEI) can be modified with carbon disulfide ($CS_2$) to yield dithiocarbamate groups. For this reaction, 6 g of 50 wt % BPEI was added to a three-neck flask along with 125 mL of 5% sodium hydroxide. The solution was stirred with a stir bar until it appeared homogeneous. Carbon disulfide (18 mL) was then added drop-wise by an additional funnel to the BPEI solution over the course of one hour. The reaction was performed at ambient temperature, and a condenser was used to ensure that minimal amounts of $CS_2$ are lost. The reaction was allowed to proceed for four hours under constant stirring. Once stirring was stopped two phases rapidly form: an upper orange, polymer-containing phase and a lower clear, $CS_2$ phase. The $CS_2$ phase was removed with a separation funnel, and the polymer phase was precipitated into acetone. A majority of the acetone was decanted, and the solids were recovered by filtration and drying in an oven at 40° C. The solids, carbon disulfide modified BPEI (BPEI-$CS_2$), were easily dissolved in DI water.

Example 3

Carbon Disulfide-Modified Chitosan

Similar to BPEI, the amine groups in chitosan can be modified with $CS_2$ to yield dithiocarbamate groups. Chitosan (cg800) was used for this experiment. The chitosan was first ground with a mortar and pestle into fine particles. For this reaction, 2 g of ground chitosan was added to a three-neck flask along with 75 mL of methanol. The solution was stirred with a stir bar while 16 mL of ammonia is added. $CS_2$ (6 mL) was then added drop-wise by an additional funnel to the chitosan slurry over the course of one hour. The reaction was performed at ambient temperature, and a condenser was used to ensure that minimal amounts of $CS_2$ were lost. The reaction was allowed to proceed for 24 hours under constant stirring. After 24 hours, the chitosan solids (chitosan-$CS_2$) appeared slightly yellow (originally white) and were easily recovered by filtration. The solids were washed three times with methanol and dried overnight in a vacuum at 50° C.

Example 4

Metal Sequestration

To test the ability of the phosphorylated lignin and BPEI-$CS_2$ to sequester metal ions, experiments were performed by adding the polymeric metal sequestrants (capture polymers) to aqueous solutions of dissolved metal salts. The metal salts used were:
Ferric chloride ($FeCl_3$)
Ferrous chloride ($FeCl_2$)

Zinc chloride (ZnCl$_2$)

Manganese Nitrate (Mn(NO$_3$)$_2$)

For each of these metal ions, the efficacy of the following processes was tested: (1) use of phosphorylated lignin as a sequestrant, (2) use of BPEI-CS$_2$ as a sequestrant, (3) use of chitosan-CS$_2$, as a sequestrant, (4) use of unmodified lignin as a sequestrant, and (5) pH adjustment (to pH ~11) of the metal salt solutions with a 1% sodium hydroxide solution. Results are shown in FIG. 1. All metal salt solutions were prepared to contain 100 ppm of the metal ion of interest. The following amounts of material were added to 20 mL of the 100 ppm metal salt solutions:

pH Adjustment: enough 1% sodium hydroxide to raise the pH to 11

Lignin: 0.1 g of unmodified lignin solids

P-Lignin: 4 mL of aqueous phosphorylated lignin solution (~5 wt %)

Chitosan Disulfide: 0.1 g of chitosan-CS$_2$ solids

BPEI-CS$_2$: 6 drops of BPEI-CS$_2$ aqueous BPEI-CS$_2$ solution (~1 wt %)

Figure 2:
FIG. 2 depicts samples where iron sequestrants have been used.

After the addition of sequestrant materials to the metal salt solutions, they were shaken for up to five minutes and allowed to sit for several hours. In most cases, precipitated metal or metal-sequestrant complexes settled out in the bottom of the vials. A representative picture of the samples' appearance after settling is shown in FIG. 2 for ferrous iron. In each case, a fluid specimen was obtained from the top of the vials and the concentration of the samples were determined with a Hach DR 2700 Spectrophotometer, using specific reagents/test kits for each metal ion. As shown in FIG. 1, greater than 90% of ferrous iron, zinc, and manganese can be removed by simple addition of either phosphorylated lignin or BPEI-CS$_2$. However, in some cases the metal ions may be bound by the added sequestrant but this complex remains suspended in solution. Thus, the data in FIG. 1 considers these suspended metal complexes the same as dissolved metal ions in solution. To remove more of the sequestered metals, we carried out a two-step process as set forth in Example 5, where the metal/sequestrant complexes are contacted with a stream of suspended solids bearing cationic surface charges.

Example 5

Metal Sequestration with Modified Solids

To assess the interaction of an anionic polymer capture system with a tether-bearing anchor particle system, various types of suspended solids were used as anchor particles. The solids used were the following:

Sand

Solids from a mine's tailings stream

Attapulgite

Zeolite

Figure 3:
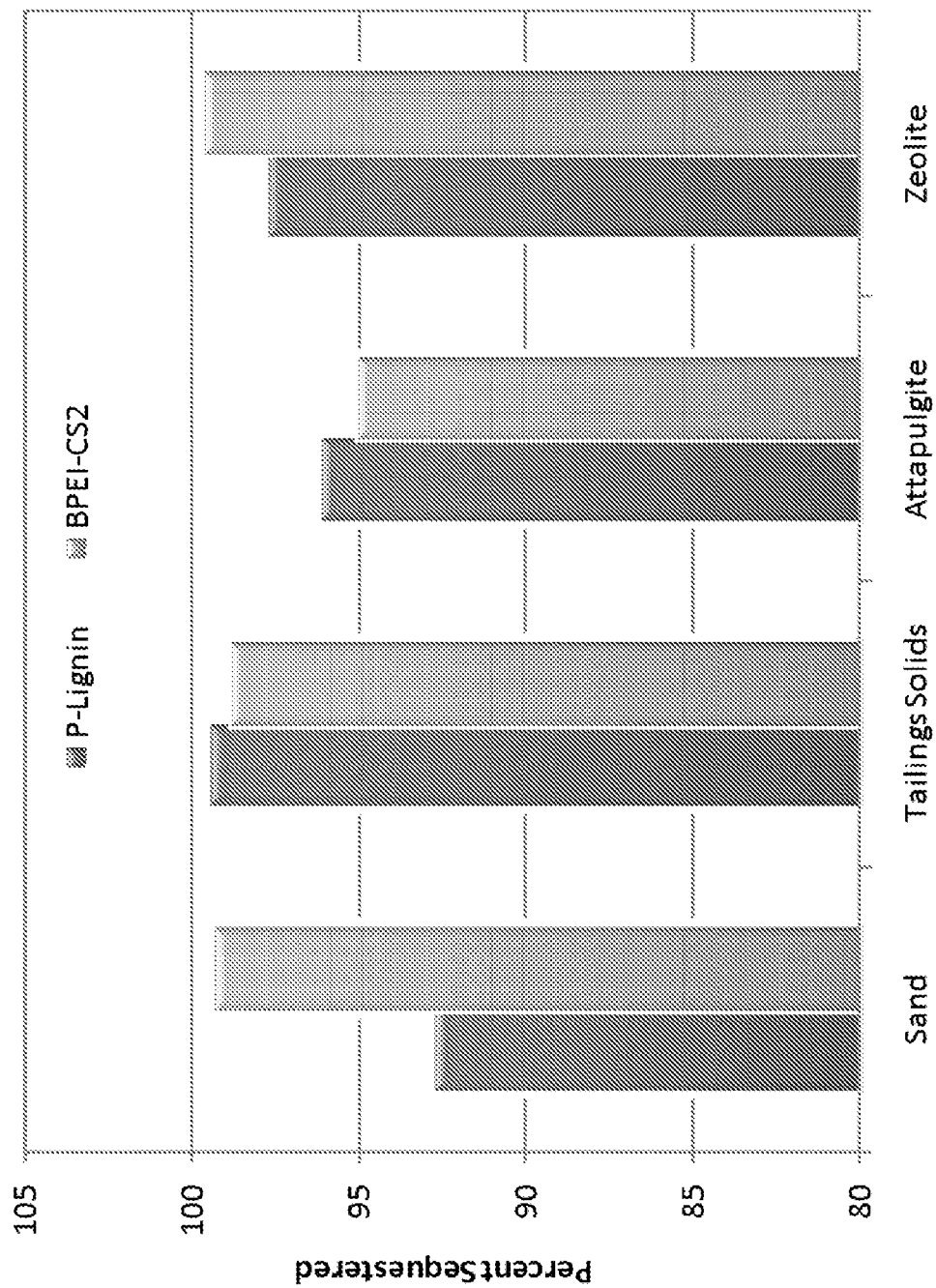
FIG. 3 shows a graph of metal sequestration using various agents.
Figures 4A, 4B:
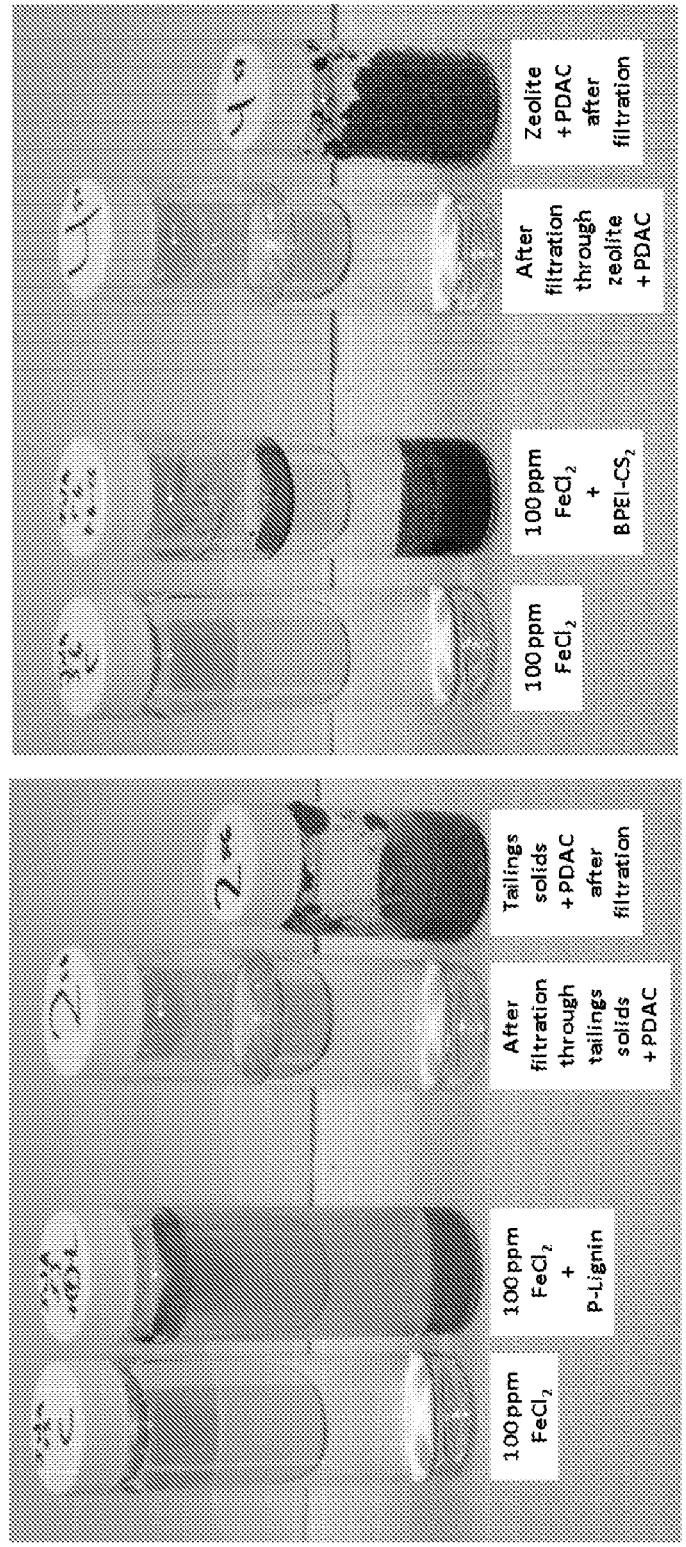
FIGS. 4A and 4B depict samples where iron sequestrants have been used.

To modify the surfaces of the solids to attach a tether polymer, 30 g of each solid anchor material was placed in 50 mL of DI water and 3.5 g of poly(diallyldimethylammonium chloride) (PDAC) is added. The slurry was gently shaken for several hours and the solids were recovered by decantation, followed by three rinses with DI water. Phosphorylated lignin and BPEI-CS$_2$ were tested as the capture polymers (sequestrants) with the cationic solids. Polymer sequestrant/metal complexes for ferrous metal were prepared in accordance with Example 4, except that the solutions were immediately used after the sequestrant was added and the solution was shaken for approximately one minute. The solutions containing the polymer sequestrant/metal complexes were then poured onto a filter that had 10 g of the cationic solids supported by qualitative filter paper. The solutions typically filtered by gravity within three minutes, but in some cases, light vacuum was applied to increase the rate of filtration. The filtrate was analyzed to determine the total iron concentration, again noting that the testing procedure does not distinguish between complexed and free metal ions. Thus, metal ions present in the filtrate could be from complexes that were not bound by the cationic solids during filtration. Results for ferrous iron sequestration by phosphorylated lignin and BPEI-CS$_2$ filtered through four different cationic solids are shown in FIG. 3. All but one system tested removed over 95% of the iron present. The two best sequestration results were for phosphorylated lignin paired with tailings solids and BPEI-CS$_2$ paired with zeolite. These systems exhibited 99.4% and 99.6% iron removal, respectively. Pictures of these two systems are shown in FIG. 4. The turbidity of both filtrates was less than 6 NTU.

Example 6

Carbon Disulfide-Modified Cationic Solids

Direct modification of cationic-coated solids with CS$_2$ was performed to determine if these functional particles could directly sequester metal ions. Table 1 lists the different formulations that were studied. All formulations were placed on a rotating mixer for at least 12 hours, and the coated solids were recovered by decantation and then rinsed three times with DI water. The solids were dried at 50° C. overnight. The polymer coated solids were reacted with CS$_2$ to produce dithiocarbamate functional groups on the chitosan and BPEI. The reaction conditions are summarized in Table 2. After a three hour reaction, the solids were recovered and washed with DI water. Preliminary testing of the CS$_2$ modified polymer-coated solids yielded poor metal sequestration properties.

TABLE 1

Polymer coated solid formulations.

| Formulation | Solid | Polymer | Water |
|---|---|---|---|
| A | Sand - 100 g | Chitosan - 5 g | 300 mL |
| B | Diatomaceous Earth - 10 g | Chitosan - 20 mL 1% solution | 100 mL |
| C | Sand - 100 g | BPEI - 5 g | 300 mL |
| D | Diatomaceous Earth - 10 g | BPEI - 1 g | 100 mL |

TABLE 2

Reaction conditions for CS$_2$ reactions with polymer coated solids.

| Formulation | Solids | 5% NaOH | CS$_2$ |
|---|---|---|---|
| A | 33 g | 125 mL | 9 mL |
| B | 5 g | 50 mL | 3 mL |
| C | 33 g | 125 mL | 9 mL |
| D | 5 g | 50 mL | 3 mL |

Example 7

Organic Removal by Capture Polymer Addition Only

In this experiment, humic acid was used as a representative organic contaminant. A 200 ppm stock solution of humic acid was made by dissolving humic acid in water. 20 mL samples were taken from the 200 ppm humic acid stock solution and treated with varying amounts of a cationic polymer, DCF-10. DCF-10 was added as a 0.1% aqueous solution. After DCF-10 was added to the 20 mL humic acid solution, the sample was shaken for 1 min on an automated shaker plate. The sample was then allowed to set for 3 min to allow any complexes formed between the polymer and humic acid to settle out. A sample of the solution was analyzed on a Hach DR-2700 spectrophotometer by measuring the absorbance at 400 nm. Comparing the absorbance to a calibration curve prepared at known humic acid concentrations yields the concentration of humic acid still in solution. Table 3 below lists the results for several different amounts of DCF-10 added to 200 ppm humic acid solutions.

TABLE 3

| Amount 0.1% DCF-10 added to humic acid solution (g) | Mass ratio of DCF-10 to humic acid (g/g) | Final humic acid concentration of solution (ppm) |
| --- | --- | --- |
| 0 | 0.0 | 202 |
| 2 | 0.5 | 130 |
| 4 | 1.0 | 127 |
| 8 | 2.0 | 115 |

A second polymer, Hyperfloc CP 905, was also tested for its ability to complex humic acid, following the same experimental protocol as above for DCF-10. Table 4 below lists the results for several different amounts of Hyperfloc CP 905 added to 200 ppm humic acid solutions.

TABLE 4

| AMOUNT 0.1% HYPERFLOC ADDED TO HUMIC ACID SOLUTION (G) | MASS RATIO OF HYPERFLOC TO HUMIC ACID (G/G) | FINAL HUMIC ACID CONCENTRATION OF SOLUTION (PPM) |
| --- | --- | --- |
| 0 | 0.0 | 202 |
| 2 | 0.5 | 128 |
| 4 | 1.0 | 85.3 |
| 8 | 2.0 | 27.2 |

Example 8

Organic Removal by Modified Solids

To improve the ease of separation of captured soluble organic materials, the capture polymer was first coated onto anchor particles. For these experiments, sand was used as the anchor particles, and Hyperfloc was used as the capture polymer. To coat the sand with the capture polymer, an amount of 0.1% capture polymer was added to 1 g of sand wetted by 5 mL of water and vigorously shaken by hand for one minute. Next, 20 mL of 200 ppm humic acid was added to the container holding the sand modified with the capture polymer. The sample was then shaken for 1 min on an automated shaker plate and allowed to set for 3 min to allow any complexes formed between the polymer coated sand and humic acid to settle out. A sample of the solution was analyzed on a Hach DR-2700 spectrophotometer by measuring the absorbance at 400 nm. Comparing the absorbance to a calibration curve prepared at known humic acid concentrations yields the concentration of humic acid still in solution. Table 5 below lists the results for two different amounts of Hyperfloc coated onto sand.

TABLE 5

| Amount 0.1% Hyperfloc added to sand (g) | Mass ratio of Hyperfloc to humic acid (g/g) | Final humic acid concentration of solution (ppm) |
| --- | --- | --- |
| 4 | 1.0 | 84.2 |
| 8 | 2.0 | 22.3 |

Example 9

Organic Removal with Capture Polymer and Modified Solids

To assess the interaction of the capture polymer with a tether-bearing anchor particle system, two tether polymers were used to coat anchor particles. For these experiments, sand was used as the anchor particles, Hyperfloc was used as the capture polymer, and Magnafloc 336 or DAF-50 was used as the tether polymer. To coat the sand with the tether polymer, an amount of 0.1% tether polymer was added to 1 g of sand wetted by 5 mL of water and vigorously shaken by hand for one minute. Next, an amount of 0.1% capture polymer is added to 20 mL of 200 ppm humic acid, the solution is shaken by hand for one minute, and then poured into the container holding the tether-bearing anchor particles. The sample was then shaken for 1 min on an automated shaker plate and allowed to set for 3 min to allow any complexes to settle out. A sample of the solution was analyzed on a Hach DR-2700 spectrophotometer by measuring the absorbance at 400 nm. Comparing the absorbance to a calibration curve prepared at known humic acid concentrations yields the concentration of humic acid still in solution. Table 6 below lists the results experiments using Magnafloc 336 as the tether.

TABLE 6

| Amount 0.1% Hyperfloc added to humic acid solution (g) | Mass ratio of capture polymer to tether polymer to humic acid | Final humic acid concentration of solution (ppm) |
| --- | --- | --- |
| 4 | 1:1:1 | 111 |
| 4 | 1:2:1 | 113 |
| 8 | 2:1:1 | 72.5 |
| 8 | 2:2:1 | 53.4 |

Table 7 below lists the results experiments using DAF-50 as the tether.

TABLE 7

| Amount 0.1% Hyperfloc added to humic acid solution (g) | Mass ratio of capture polymer to tether polymer to humic acid | Final humic acid concentration of solution (ppm) |
| --- | --- | --- |
| 4 | 1:1:1 | 133 |
| 4 | 1:2:1 | 101 |
| 8 | 2:1:1 | 121 |
| 8 | 2:2:1 | 57.6 |

Example 10

Metal Sequestration with Base Treatment and Modified Solids

Using zinc as an example metal ion, the following processes were tested: (1) base treatment to pH 10, (2) base treatment to pH 10 followed by addition of Flopam AN 310VHM (an anionic polyacrylamide), (3) base treatment to pH 10 followed by exposure to sand coated with PDAC, and (4) base treatment to pH 10 followed by addition of Flopam AN 310VHM and then exposure to sand coated with PDAC. The amount of Flopam AN 310VHM added was 500 ppm based on the amount of zinc ions present.

Base treatment was accomplished by adding enough 1% sodium hydroxide solution to raise the pH to 10. Sand was used as the anchor. To coat the sand with the PDAC, an amount of 0.1% tether polymer was added to 1 g of sand wetted by 5 mL of water and vigorously shaken by hand for one minute. After treatment, samples were shaken for up to five minutes and allowed to sit for 30 minutes. For each sample a fluid specimen was obtained from the top of the vials and the zinc concentration of the samples were determined with a Hach DR 2700.

Table 8 below shows the results of these tests:

TABLE 8

| Sample | Initial concentration (ppm) | Final concentration (ppm) | % Removal |
| --- | --- | --- | --- |
| Control | 95 | 95 | 0 |
| Base treatment | 95 | 20.2 | 78.7 |
| Base treatment + capture | 95 | 5.0 | 94.7 |
| Base treatment + tethered anchor | 95 | 7.6 | 92.0 |
| Base treatment + capture & tethered anchor | 95 | 4.6 | 95.2 |

EQUIVALENTS

While specific embodiments of the subject invention have been discussed, the above specification is illustrative and not restrictive. Many variations of the invention will become apparent to those skilled in the art upon review of this specification. Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth herein are approximations that can vary depending upon the desired properties sought to be obtained by the present invention.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for removing a dissolved metal cation from an aqueous fluid, comprising:
    modifying a polymer by phosphorylation or carbon disulfide-modification to form a capture polymer, wherein the capture polymer is anionic,
    adding to the fluid the capture polymer, wherein the capture polymer sequesters the dissolved metal cation,
    adding to the fluid a tether polymer-bearing anchor particle after the addition of the capture polymer to the fluid according to the preceding step, wherein the tether polymer attaches the capture polymer to the tether polymer-bearing anchor particle thereby forming a solid material comprising the anchor particles and the sequestered metal cation, wherein the tether polymer is a cationic polymer, and
    removing from the fluid the solid material, whereby removing the solid material from the fluid removes the metal cation from the fluid.

2. The method of claim 1, wherein the capture polymer is a polyamine modified by carbon disulfide-modification.

3. The method of claim 1, wherein the capture polymer is a polymer selected from the group consisting of phosphorylated chitosan, phosphorylated lignin, carbon disulfide-modified polyacrylamide, and carbon disulfide-modified branched polyethyleneimine.

4. The method of claim 3, wherein the capture polymer is a carbon disulfide-modified polyacrylamide.

5. The method of claim 4, wherein the polymer modified by carbon disulfide-modification is partially hydrolyzed polyacrylamide and wherein the capture polymer is anionic.

6. The method of claim 1, wherein the fluid is tailings from mining.

* * * * *